W. W. WELLER.
DISK PLOW.
APPLICATION FILED SEPT. 27, 1913.
1,096,478.
Patented May 12, 1914.
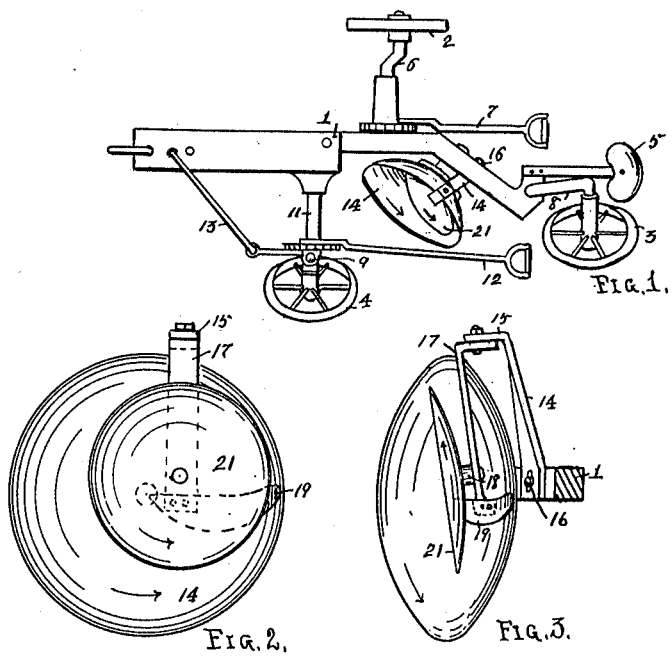

UNITED STATES PATENT OFFICE.

WARREN W. WELLER, OF HAMILTON, OHIO, ASSIGNOR OF ONE-HALF TO EDWIN WELLER, OF HAMILTON, OHIO.

DISK PLOW.

1,096,478. Specification of Letters Patent. Patented May 12, 1914.

Application filed September 27, 1913. Serial No. 792,195.

*To all whom it may concern:*

Be it known that I, WARREN W. WELLER, a citizen of the United States, residing at Hamilton, Ohio, have invented a new and useful Improvement in Disk Plows, of which the following is a specification.

This invention relates to disk plows of the class wherein one or more cutting disks are rotatively mounted on a suitable frame or beam supported on the usual ground wheels, and the objects of my improvement are to provide means for adapting the plow to a wider range of conditions of soil by combining a general purpose and a sod plow in one structure; to provide an auxiliary or turning disk for increasing the turning over of the soil, so desirable in the plowing of sod or in trashy ground; to provide means for adjusting the turning disk in relation to the cutting disk, and to provide simple and durable construction and assemblage of the various parts for securing facility of operation and efficiency of action. These objects may be attained in the following described manner, as illustrated in the accompanying drawings, in which:—

Figure 1 is a plan of a plow provided with my improved turning disk; Fig. 2, a front elevation of the cutting disk with the turning disk in operative position, and Fig. 3, an edge view of the turning disk and its adjustable connections with the beam and in relative position to the cutting disk.

In the drawings, 1 represents the beam of a riding disk plow supported on ground wheels 2, 3 and 4. The seat 5 is supported on the rear end of the beam; the land wheel 2 is mounted on a crank axle 6 which is under control of the hand lever 7; the rear wheel 3 is swiveled on the rear end of the beam by means of the angular spindle 8; the furrow wheel 4 has its spindle hinged at 9 on the axle 11 which is controlled by means of the hand lever 12. Said spindle being adjustably connected to the front end of the beam by means of the draft rod 13; and 14 the rotary concavo-convex cutting disk mounted on the beam and facing outwardly therefrom, all being constructed and arranged in the ordinary manner.

A standard 14 formed with a foot 15 is adjustably secured on the beam by means of the bolt 16, and the depending bracket 17 provided with a bearing 18 is adjustably secured to said foot with said bearing in a rearward and upward direction from the axis of the cutting disk. Said bracket terminates in engagement with the usual scraper 19 for the cutting disk. The turning disk 21 slightly concavo-convex in form is provided with a spindle on its convex face whereby it is journaled in bearing 18 with its concave face in an outward direction and in a plane at an oblique angle to the plane of the cutting disk so that the lower front portion of its edge will almost contact with the concave surface of the cutting disk as shown in Figs. 1 and 3, and out of contact with the intervening scraper 19.

In operation, the disks are both journaled with their concave faces in an outward direction and turned by the soil in a forward direction as shown by the arrows. The turning disk being about three-fifths the diameter of the cutting disk and having a more outward inclination its smooth concave face serves to continue the turning of the soil from the cutting disk a farther distance than would be possible by means of any stationary scraper however much it might be curved in an outward direction. The clogging of the soil on a fixed scraper limits its turning thereof but the action of the soil on the moving surface of the turning disk keeps its surface cleanly scoured and permits it to be further inclined in an outward direction with corresponding increased efficiency. The almost universal adjustment of the turning disk in relation to the cutting disk by means of the standard and bracket adapts it for use in the greatest variety of soil conditions. The turning of the auxiliary disk under the action of the soil affords so little resistance thereto that the draft of the plow is materially lightened.

Having fully described my improvement, what I claim as my invention and desire to secure by Letters Patent of the United States is:—

1. A disk plow comprising a concavo-convex cutting disk, a similar disk of less diameter journaled in front of the cutting disk and in the rear of its axis, and with its plane at an oblique angle to the plane of the cutting disk for increasing the turning of the soil therefrom.

2. A disk plow comprising a concavo-convex cutting disk, a similar disk journaled rearwardly of the axis thereof and inclined in a forward and outward direction to the plane of the cutting disk and with its forward edge in near proximity to the face thereof for automatically increasing the turning of the soil in its passage from the cutting disk thereover.

3. In a plow, the combination with the concavo-convex cutting disk of a similar coöperating auxiliary disk journaled rearwardly and upwardly from the axis of the cutting disk with its face in the same outward direction and at an angle to the face thereof for increasing the turning of the soil from the cutting disk.

4. In a plow of the class described, a cutting disk, an auxiliary disk adjustably supported at a fixed point and forwardly and downwardly inclined toward and near the face of the cutting disk for the purpose specified, and a scraper for the cutting disk supported between said disks.

5. In a plow, the combination with a cutting disk of an adjustable bracket, a scraper thereon for said disk, and an auxiliary coöperating disk journaled on the bracket to turn at an oblique angle to the face of the cutting disk, for the purpose specified.

WARREN W. WELLER.

Witnesses:
EDWIN WELLER,
HARRY S. WONNELL.

---

Copies of this patent may be obtained for five cents each, by addressing the "Commissioner of Patents, Washington, D. C."